United States Patent
Nunes et al.

(10) Patent No.: US 12,434,856 B2
(45) Date of Patent: Oct. 7, 2025

(54) BI-FOLD BARRIER SYSTEM AND METHOD FOR A FLIGHT DECK OF AN AIRCRAFT

(71) Applicant: THE BOEING COMPANY, Arlington, VA (US)

(72) Inventors: Daniel Bryan Nunes, Snohomish, WA (US); Gregory Smith, Edmonds, WA (US); Steven Ellis Rhynard, Mukilteo, WA (US); Hakeem Haj-Musa, Bellevue, WA (US); Paul James Saum Addis, Bothell, WA (US); Sean M. Finerty, Bothell, WA (US); Daniel Paul Warren, Lake Stevens, WA (US); Nathan Lee Near, Arlington, WA (US)

(73) Assignee: The Boeing Company, Alexandria, VA (US)

( * ) Notice: Subject to any disclaimer, the term of this patent is extended or adjusted under 35 U.S.C. 154(b) by 0 days.

(21) Appl. No.: 18/405,260

(22) Filed: Jan. 5, 2024

(65) Prior Publication Data
US 2025/0223053 A1    Jul. 10, 2025

(51) Int. Cl.
*B64D 45/00* (2006.01)

(52) U.S. Cl.
CPC ..... *B64D 45/0026* (2019.08); *B64D 45/0028* (2019.08)

(58) Field of Classification Search
CPC ............ B64D 45/0021; B64D 45/0026; B64D 45/0028; B64D 45/0029; Y10T 292/696; Y10S 292/15
USPC .................................................... 49/381, 472
See application file for complete search history.

(56) References Cited

U.S. PATENT DOCUMENTS

| | | | | |
|---|---|---|---|---|
| 1,876,881 | A * | 9/1932 | Durant | E05C 17/54 292/288 |
| 6,659,401 | B1 * | 12/2003 | Semprini | B64D 45/0029 244/129.5 |
| 7,984,875 | B2 * | 7/2011 | Koehn | B64D 45/0028 244/129.5 |
| 9,518,421 | B2 * | 12/2016 | Cushwa, Jr. | E06B 9/02 |
| 10,392,096 | B2 * | 8/2019 | Guering | B64D 45/0026 |
| 12,084,164 | B2 * | 9/2024 | Movsesian | B64C 1/1461 |
| 2003/0047648 | A1 * | 3/2003 | Batt | B64C 1/1469 244/118.5 |

(Continued)

FOREIGN PATENT DOCUMENTS

EP         4477530         12/2024
WO    WO-2004007285 A2 *   1/2004   ............ B64C 1/1469

OTHER PUBLICATIONS

Extended European Search Report for EP App. No. 24214847.6-1004, dated Mar. 31, 2025.

*Primary Examiner* — Joshua J Michener
*Assistant Examiner* — Ryan Andrew Yankey
(74) *Attorney, Agent, or Firm* — Joseph M. Butscher; The Small Patent Law Group LLC

(57) ABSTRACT

An aircraft includes a flight deck including a flight deck door configured to be moved between an open position and a closed position, a first monument, second monument, and a secondary barrier door moveably secured between the first monument and the second monument. The secondary barrier door is configured to fold into a stowed position in which a path to the flight deck is open, and unfold into a deployed position in which the path to the flight deck is closed.

20 Claims, 14 Drawing Sheets

(56) References Cited

U.S. PATENT DOCUMENTS

| | | | |
|---|---|---|---|
| 2003/0052227 A1* | 3/2003 | Pittman | B64D 45/0026 244/118.5 |
| 2006/0000946 A1* | 1/2006 | Garofani | B64D 11/00 52/64 |
| 2015/0289695 A1* | 10/2015 | Woodruff | A47F 5/0006 410/101 |
| 2016/0083092 A1* | 3/2016 | Long | B64D 11/02 160/213 |
| 2016/0332718 A1* | 11/2016 | Guering | B64D 45/0028 |
| 2018/0346091 A1 | 12/2018 | Movesian | |
| 2019/0241247 A1* | 8/2019 | Movsesian | B64D 45/0028 |
| 2021/0291955 A1 | 9/2021 | Breigenzer | |
| 2022/0355949 A1 | 11/2022 | Reinck | |
| 2023/0047018 A1* | 2/2023 | Chadwell | B64C 1/1469 |
| 2023/0083772 A1 | 3/2023 | Chadwell | |

\* cited by examiner

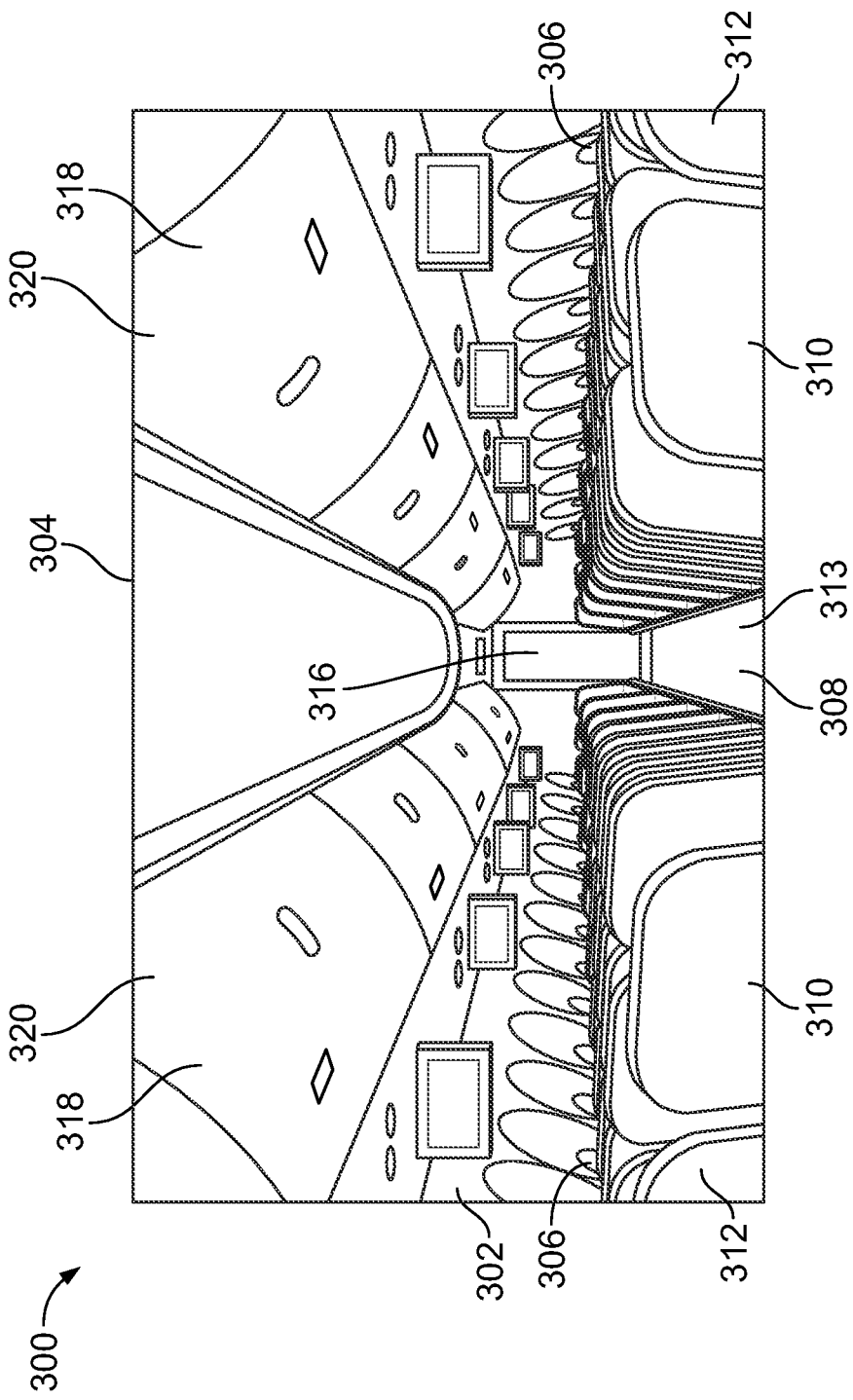

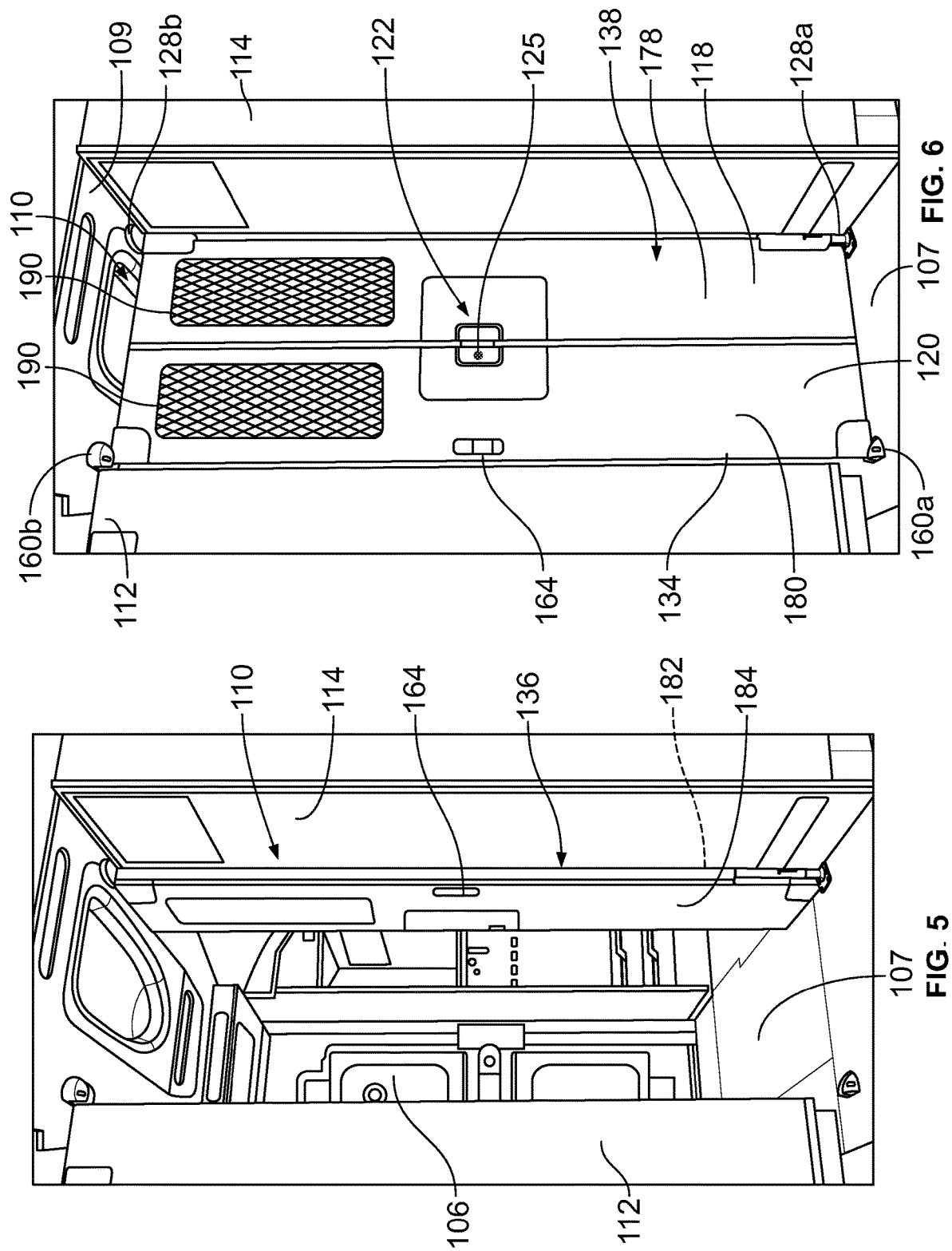

BI-FOLD BARRIER SYSTEM AND METHOD FOR A FLIGHT DECK OF AN AIRCRAFT

FIELD OF THE DISCLOSURE

Examples of the present disclosure generally relate to bi-fold barrier systems and methods for a flight deck of an aircraft.

BACKGROUND OF THE DISCLOSURE

Vehicles such as commercial aircraft are used to transport passengers between various locations. A commercial aircraft includes a flight deck (such as a cockpit) in which one or more pilots operate the aircraft.

Flight deck doors are used to selectively open and close a flight deck. During a flight, a flight deck door is typically locked in a closed position to prevent passengers from entering into the flight deck. The flight deck door can be opened during a flight to allow crew members to access lavatory facilities, receive meals, and/or switch positions for resting purposes.

The opening and closing of the flight deck door (referred to as "door transition") can reduce protective benefits of the flight deck door. In particular, when the flight deck door is opened, the flight deck is generally open. In order to ensure that passengers cannot enter into the flight deck during a door transition, a galley cart can be moved in position to provide a barrier to the flight deck. However, individuals may be able to move the galley cart, and gain access to the flight deck.

SUMMARY OF THE DISCLOSURE

A need exists for a barrier system and a method for preventing access to a flight deck during a door transition. Further, a need exists for an efficient and effective system and method for providing a secondary barrier to a flight deck.

With those needs in mind, certain examples of the present disclosure provide an aircraft including a flight deck including a flight deck door configured to be moved between an open position and a closed position, a first monument, a second monument, and a secondary barrier door moveably secured between the first monument and the second monument. The secondary barrier door is configured to fold into a stowed position in which a path to the flight deck is open, and unfold into a deployed position in which the path to the flight deck is closed.

In at least one example, the secondary barrier door includes a first panel, a second panel, and a pivot hinge pivotally coupling the first panel to the second panel. The first panel is folded adjacent to the first monument, and the second panel is folded adjacent to the first panel when the secondary barrier door is in the stowed position. In at least one example, the first panel is pivotally coupled to a lower pivot bearing secured to a floor, and an upper pivot bearing secured to a ceiling. The aircraft can also include a lower bearing and an upper bearing configured to receive and retain an end of the second panel when the secondary barrier door is in the deployed position. The pivot hinge can also include a lock configured to secure the secondary barrier door in a desired position.

In at least one example, the secondary barrier door in the deployed position extends between the first monument and the second monument. A closed security vestibule is defined between the flight deck, the first monument, the second monument, and the secondary barrier door in the deployed position. The secondary barrier door is in front of a passenger seating area.

In at least one example, the secondary barrier door includes an override device configured to allow the secondary barrier door to be removed.

Certain examples of the present disclosure provide a method including folding the secondary barrier door into the stowed position in which the path to the flight deck is open, and unfolding the secondary barrier into the deployed position in which the path to the flight deck is closed.

BRIEF DESCRIPTION OF THE DRAWINGS

FIG. 4 illustrates a perspective interior view of an internal cabin of an aircraft, according to an example of the present disclosure.

FIG. 5 illustrates a perspective front view of a secondary barrier door in a stowed position, according to an example of the present disclosure.

FIG. 6 illustrates a perspective front view of the secondary barrier door of FIG. 5 in a deployed position.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Figure 1:
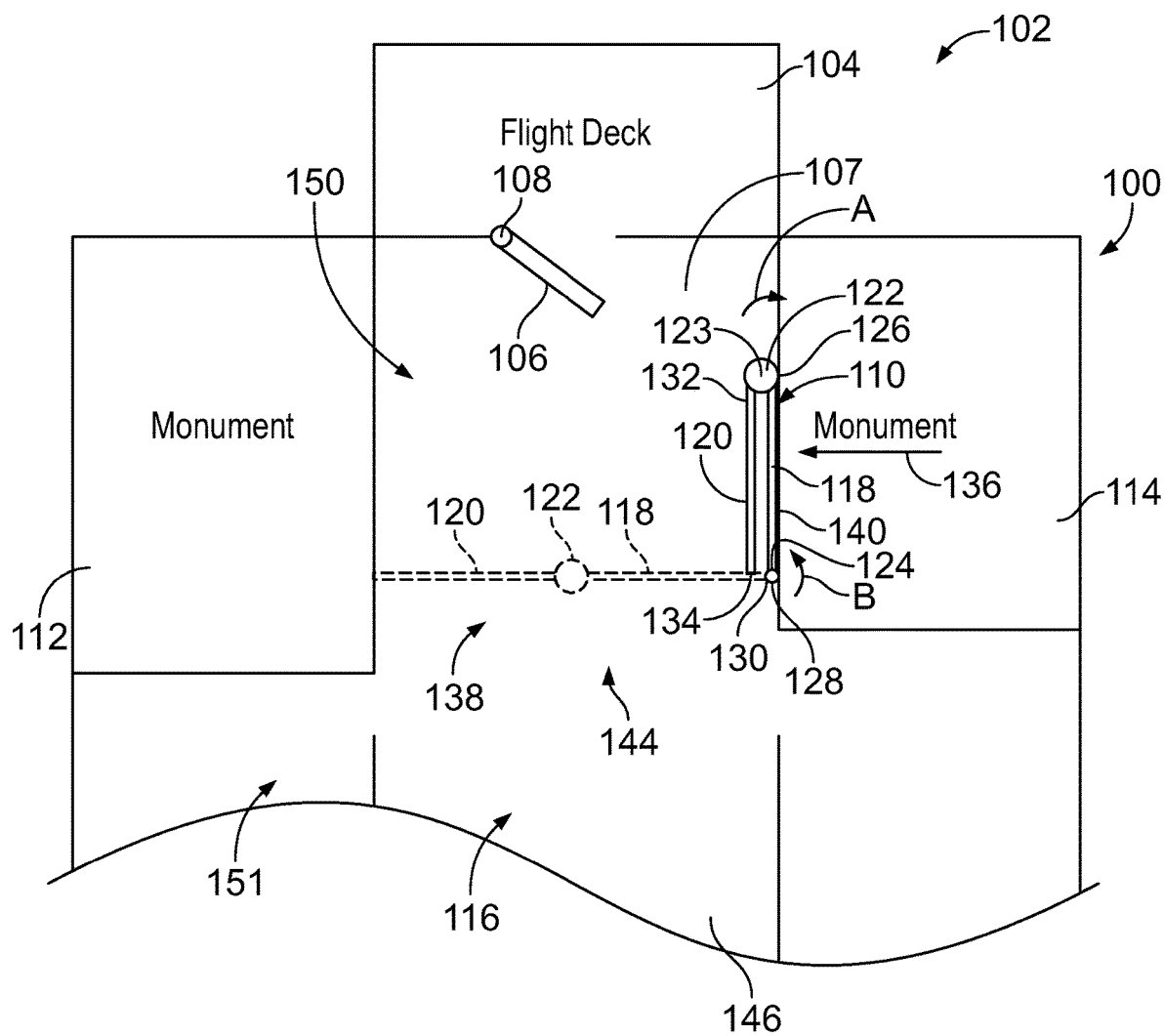
FIG. 1 illustrates a simplified top view of a portion of an internal cabin of an aircraft, according to an example of the present disclosure.

FIG. 1 illustrates a simplified top view of a portion of an internal cabin 100 of an aircraft 102, according to an example of the present disclosure. The internal cabin 100 includes a flight deck 104 (such as a cockpit) in which one or more pilots operate the aircraft 102. A primary flight deck door 106 is configured to be opened and closed to selectively allow and prevent access into the flight deck 104. The flight deck door 106 is generally reinforced and configured to be securely locked into a closed position. The flight deck door 106 generally extends between a floor 107 of the internal cabin 100 and to and into a frame, thereby reducing any open areas therebetween in the closed position. The flight deck door 106 is configured to pivot about a pivot axis 108, such as via one or more hinges, between the open position and the closed position. The pivot axis 108 is generally vertical in relation to the floor 107. In this manner, the flight deck door 106 is configured to pivot about a vertical axis between the open and closed position.

In order to protect the flight deck 104 during a door transition, a secondary barrier door 110 is moveably coupled in relation to one or more monuments 112 (for example, a first monument), 114 (for example, a second monument) that are aft (that is, rearwardly disposed) from the flight deck 104. For example, the monument 112 can be a partition, a lavatory, a closet, a galley, or the like. Similarly, the monument 114 can be a partition, a lavatory, a closet, a galley, or the like. The monument 112 is across an aisle 116 from the monument 114. The secondary barrier door 110 can be moveably secured to the monuments 110 and/or 112. As another example, the secondary barrier door 110 can be moveably secured to a floor and/or ceiling, and spaced from the monuments 110 and/or 112.

The secondary barrier door 110 includes a first panel 118 pivotally coupled to a second panel 120 by a pivot hinge 122, such as can include one or more axles pivotally retained within one or more sleeves. The first panel 118 and the second panel 120 can be sized and shaped the same. Optionally, the first panel 118 can be larger or smaller than the second panel 120.

The pivot hinge 122 defines a pivot axis 123. For example, the pivot hinge 122 can include a single axle pivotally retained within a single reciprocal sleeve. As another example, the pivot hinge 122 can include two or more coaxial axles pivotally retained within two or more reciprocal sleeves. The first panel 118 includes a first end 124 and a second end 126. The first end 124 is pivotally coupled to one or more pivot bearings 128, which define a pivot axis 130. The pivot bearing(s) 128 are secured to one or more of the floor 107, a ceiling, and/or the monument 114. The second end 126 of the first panel 118 is coupled to the pivot hinge 122. The second panel 120 includes a first end 132 coupled to the pivot hinge 122, and a second end 134 that is distally located from the pivot hinge 122.

In operation, the secondary barrier door 110 is configured to pivotally move between a stowed position 136, in which the secondary barrier door 110 is open, and a deployed position 138, in which the secondary barrier door 110 is closed. In the stowed position, the secondary barrier door 110 is folded in relation to the monument 114. In particular, in the stowed position, the first panel 118 is substantially parallel (such as within +/−5 degrees) with a wall 140, and the second panel 120 is folded in relation to the first panel 118 to be substantially parallel (such as within +/−5 degrees) with the first panel 118. The first panel 118 and the second panel 120 are configured to fold in relation to one another via the pivot hinge 122.

In at least one example, in the stowed position, the first panel 118 is adjacent to (for example, abuts against) the wall 140 of the monument 114, and the second panel 120 is adjacent to (for example, abuts against) the first panel 118. Optionally, in the stowed position, the first panel 118 can be spaced a distance from the wall 140 (such as 2 inches or less), and the second panel 120 can be spaced a distance from the first panel 118 9 such as 2 inches or less).

In order to close the secondary barrier door 110, the second end 134 of the second panel 120 is grasped (such as via a handle) and moved toward the monument 112 across the aisle 116. As the second panel 120 is moved toward the monument 112, the pivot hinge 122 rotates in the direction of arc A, while the first panel 118 pivots about the pivot axis 130 in the direction of arc B, thereby unfolding the secondary barrier door 110. As the secondary barrier door 110 continues to unfold in such manner, the second panel 120 extends toward the monument 112, and the first panel 118 and the second panel 120 continue to pivot toward an aligned, coplanar state about the pivot hinge 122 until the second end 134 of the second panel 120 reaches the monument 112. When the second panel 120 reaches the monument 112, the secondary barrier door 110 is fully extended (and unfolded), such that the secondary barrier door 110 is in the deployed position (and closed position).

In order to move the secondary barrier door 110 from the deployed position 138 into the stowed position 136, the process is reversed. In particular, the secondary barrier door 110 is pivoted into a folded position, and stowed adjacent to the monument 114, thereby providing an open path to the flight deck 104 (which can have the primary flight deck door 106 in a closed position).

As described herein, the secondary barrier door 110 is configured to pivotally move between the stowed position 136 and the deployed position 138. The secondary barrier door 110 includes the first panel 118 pivotally coupled to the second panel 120, such as via the pivot hinge 122. In the stowed position 136, the first panel 118 and the second panel 120 are folded in relation to one another, and in relation to the monument 114. In the deployed position 138, the first panel 118 and the second panel 120 are unfolded to extend between the monument 114 and the monument 112.

In the stowed position 136, the secondary barrier door 110 is open, such that a path 144 to the flight deck 104 is open. The path 144 can be a forward end 146 of the aisle 116 within the internal cabin 100. In the deployed position 138, the secondary barrier door 110 extends across the path 144, between the monument 112 and the monument 114, thereby providing a closed barrier that blocks access to the flight deck 104.

In the deployed position 110b, the secondary barrier door 110 extends between the monument 112 and the monument 114. In the deployed position, the second end 134 can securely couple to one or more reciprocal structures, such as latches, bearings, and/or the like that retain the secondary barrier door 110 in the deployed position 138. For example, the end 134 of the second panel 120 of the secondary barrier door 110 secures to one or more securing devices, such as latch(es) or lock(s), (such as on the floor, ceiling, and/or on the monument 112) to securely lock the secondary barrier door 110 in the deployed position 138. The securing device(s) can be latches, bearings, manual locks, electronic locks, electromechanical locks, and/or the like. The second panel 120 of the secondary barrier door 110 can also include a handle, strap, or the like that is configured to allow an individual to grasp the secondary barrier door 110 and unfold the secondary barrier door 110 into the deployed position 138, and fold the secondary barrier door 110 into the stowed position 136.

When the secondary barrier door 110 (which is aft from the flight deck door 106) is in the deployed position 110b, a closed security vestibule 150 is defined between the flight deck 104, the monument 112, the monument 114, and the secondary barrier door 110. The closed security vestibule 150 is closed off from a passenger seating area 151 of the internal cabin 100. As such, the secondary barrier door 110 in the deployed position 138 provides a secure barrier that prevents access to the flight deck 104, even if the flight deck door 106 is in the open position.

The secondary barrier door 110 is in front of (that is, closer to the fore end of the aircraft 102) the passenger seating area 151. The secondary barrier door 110 is not within the passenger seating area 151. Instead, the secondary barrier door 110 in the deployed position prevents access from the passenger seating area 151 into the closed security vestibule 150.

In at least one example, the secondary barrier door 110 is coupled to the floor 107, the ceiling, and/or the monument 114 by pivot bearing(s) 128 without a track. That is, there is no need for a guide track. Instead, the secondary barrier door 110 is configured to be move between the stowed position 136 and the deployed position 138 without the use of a track, a retaining frame, and/or the like.

As shown, the secondary barrier door 110 in the stowed position 136 is folded adjacent to (for example, against) the monument 114. Optionally, the secondary barrier door 110 in the stowed position 136 can be folded adjacent to (for example, against) the monument 112, and configured to extend toward the monument 114 into the deployed position 138.

As described herein, the aircraft 102 includes the internal cabin 100 having the flight deck 104 including the flight deck door 106 configured to be moved between an open position and a closed position. The internal cabin 100 also includes the first monument 112 or 114 and the second monument 114 or 112. The secondary barrier door 110 is moveably secured between the first monument 112 or 114 and the second monument 114 or 112. The secondary barrier door 110 is configured to fold into the stowed position 136 in which the path 144 to the flight deck 104 is open, and unfold into the deployed position 138 in which the path 144 to the flight deck 104 is closed. In at least one example, the secondary barrier door 110 includes the first panel 118, the second panel 120, and the pivot hinge 122 pivotally coupling the first panel 118 to the second panel 120. In at least one example, the first panel 118 is folded adjacent to the monument 114, and the second panel 120 is folded adjacent to the first panel 118 when the secondary barrier door 110 is in the stowed position 136. The secondary barrier door 110 in the deployed position 138 extends between the first monument 112 or 114 and the second monument 114 or 112. The closed security vestibule 150 is defined between the flight deck 104, the first monument 112 or 114, the second monument 114 or 112, and the secondary barrier door 110 in the deployed position 138.

Figure 2:
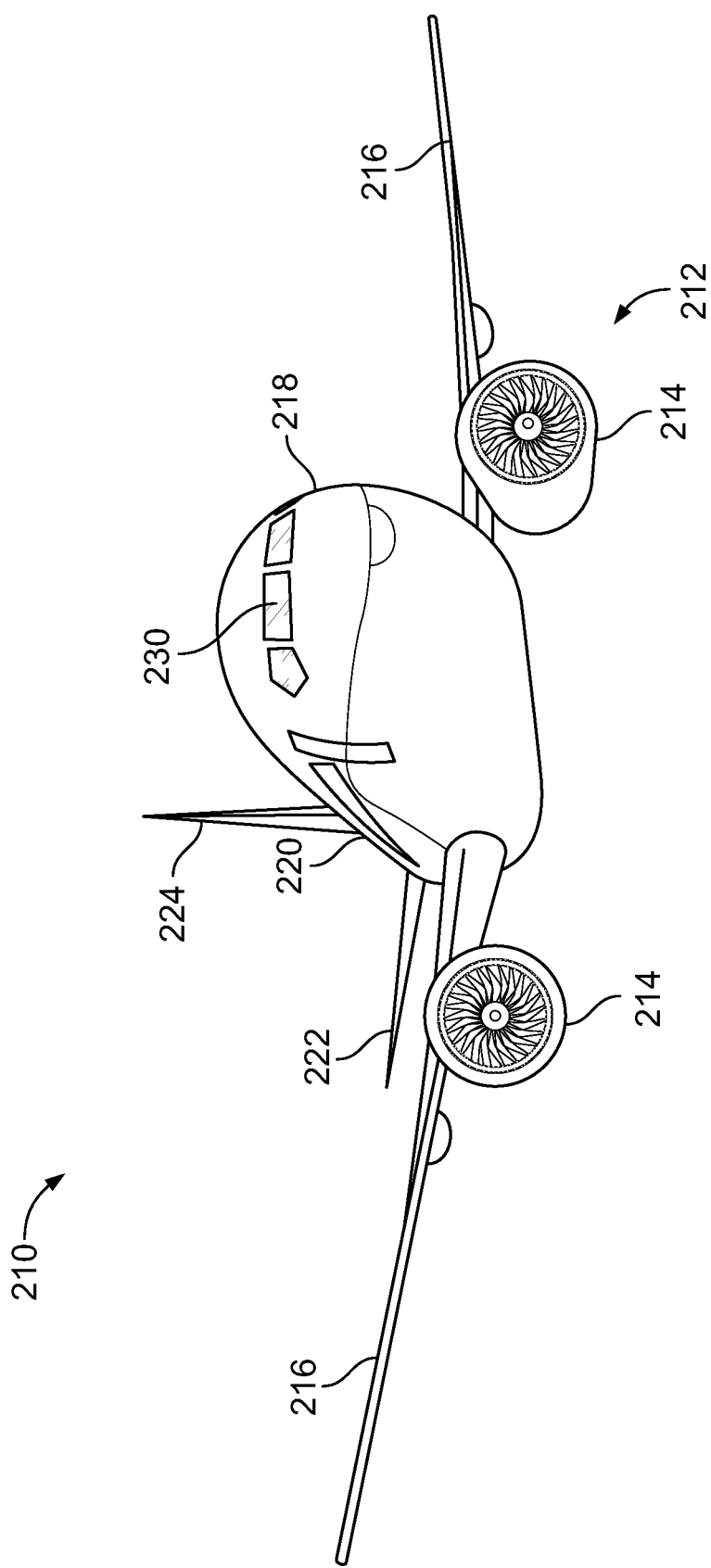
FIG. 2 illustrates a perspective front view of an aircraft, according to an example of the present disclosure.

FIG. 2 illustrates a perspective front view of an aircraft 210, according to an example of the present disclosure. The aircraft 210 is an example of the aircraft 102, shown in FIG. 1. The aircraft 210 includes a propulsion system 212 that includes engines 214, for example. Optionally, the propulsion system 212 may include more engines 214 than shown. The engines 214 are carried by wings 216 of the aircraft 210. In other examples, the engines 214 may be carried by a fuselage 218 and/or an empennage 220. The empennage 220 may also support horizontal stabilizers 222 and a vertical stabilizer 224.

The fuselage 218 of the aircraft 210 defines an internal cabin 230, which includes a flight deck, one or more work sections (for example, galleys, personnel carry-on baggage areas, and the like), one or more passenger sections (for example, first class, business class, and coach sections), one or more lavatories, and/or the like. The internal cabin 230 is an example of the internal cabin 100, as shown in FIG. 1.

Alternatively, instead of an aircraft, examples of the present disclosure may be used with various other vehicles, such as automobiles, buses, locomotives and train cars, watercraft, and the like. Further, examples of the present disclosure may be used with respect to fixed structures, such as commercial and residential buildings.

Figure 3A:
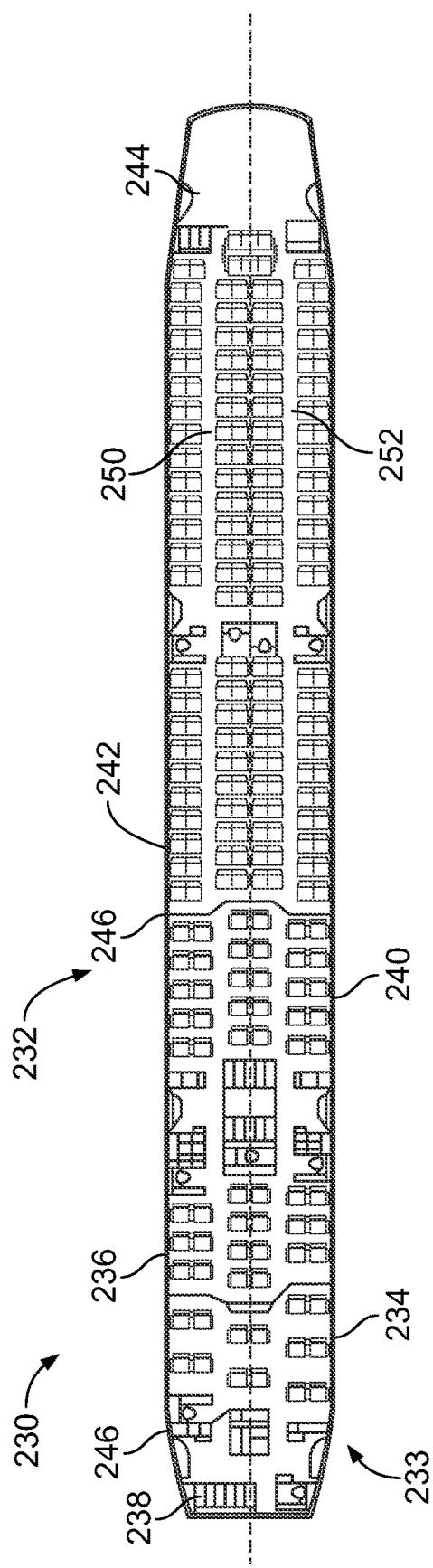
FIG. 3A illustrates a top plan view of an internal cabin of an aircraft, according to an example of the present disclosure.

FIG. 3A illustrates a top plan view of an internal cabin 230 of an aircraft, according to an example of the present disclosure. The internal cabin 230 may be within the fuselage 232 of the aircraft, such as the fuselage 218 of FIG. 2. For example, one or more fuselage walls may define the internal cabin 230. The internal cabin 230 includes multiple areas, including a front section 233, a first-class section 234, a business class section 236, one or more galley stations, an expanded economy or coach section 240, a standard economy of coach section 242, and an aft section 244. It is to be understood that the internal cabin 230 may include more or less areas than shown. For example, the internal cabin 230 may not include a first-class section, and may include more or less galley stations than shown. Each of the sections may be separated by a cabin transition area, which may include class divider assemblies between aisles.

As shown in FIG. 3A, the internal cabin 230 includes two aisles 250 and 252 that lead to the aft section 244. Optionally, the internal cabin 230 may have fewer or more aisles than shown. For example, the internal cabin 230 may include a single aisle that extends through the center of the internal cabin 230 that leads to the aft section 244.

Figure 3B:
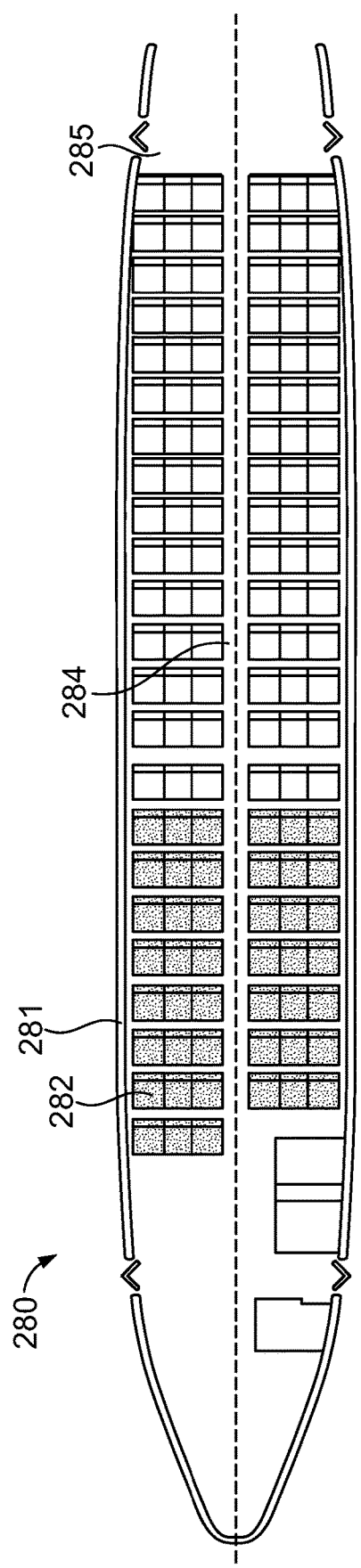
FIG. 3B illustrates a top plan view of an internal cabin of an aircraft, according to an example of the present disclosure.

FIG. 3B illustrates a top plan view of an internal cabin 280 of an aircraft, according to an example of the present disclosure. The internal cabin 280 is an example of the internal cabin 230 shown in FIG. 2. The internal cabin 280 may be within a fuselage 281 of the aircraft. For example, one or more fuselage walls may define the internal cabin 280. The internal cabin 280 includes multiple areas, including a main cabin 282 having passenger seats, and an aft section 285 behind the main cabin 282. It is to be understood that the internal cabin 280 may include more or less areas than shown.

The internal cabin 280 may include a single aisle 284 that leads to the aft section 285. The single aisle 284 may extend through the center of the internal cabin 280 that leads to the aft section 285. For example, the single aisle 284 may be coaxially aligned with a central longitudinal plane of the internal cabin 280. The aisle can optionally be offset from a centerline of the fuselage.

FIG. 4 illustrates a perspective interior view of an internal cabin 300 of an aircraft, according to an example of the present disclosure. The internal cabin 300 is an example of the internal cabin 100 shown in FIG. 1. The internal cabin 300 includes outboard walls 302 connected to a ceiling 304. Windows 306 may be formed within the outboard walls 302. A floor 308 supports rows of seats 310. As shown in FIG. 4, a row 312 may include two seats 310 on either side of an aisle 313. However, the row 312 may include more or less seats 310 than shown. Additionally, the internal cabin 300 may include more aisles than shown.

A flight deck door 316 is at an aft end of a flight deck. The flight deck door 316 in the closed position closes access into the flight deck.

Overhead stowage bin assemblies 318 are secured to the ceiling 304 and/or the outboard wall 302. The overhead stowage bin assemblies 318 are secured over the seats 310. The overhead stowage bin assemblies 318 extend between the front and rear end of the internal cabin 300. Each stowage bin assembly 318 may include a pivot bin or bucket 320 pivotally secured to a strongback. The overhead stowage bin assemblies 318 are configured to be pivoted open in order to receive passenger carry-on baggage and personal items, for example.

Figure 7:
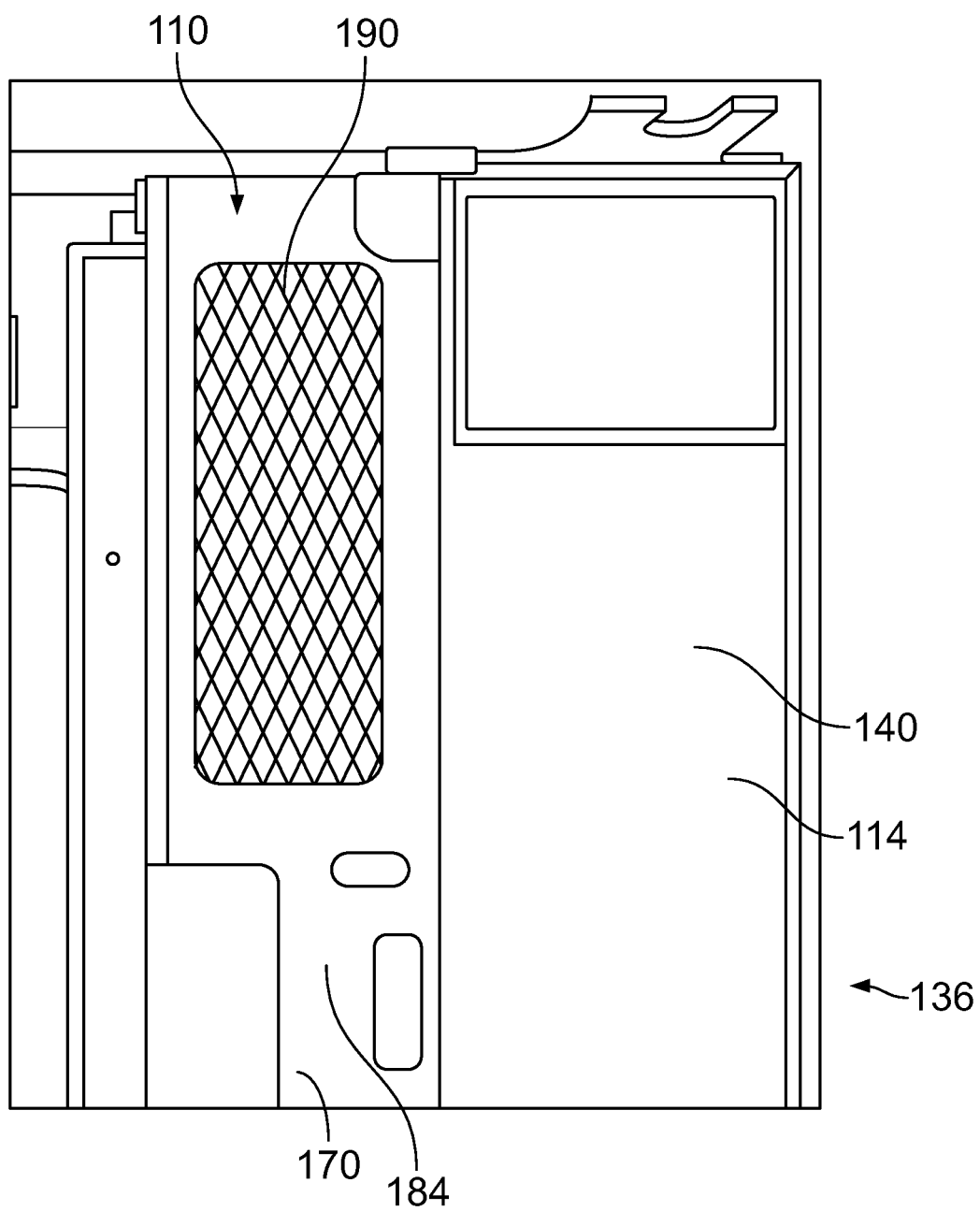
FIG. 7 illustrates a lateral view of the secondary barrier door in the stowed position, according to an example of the present disclosure.
Figure 8:
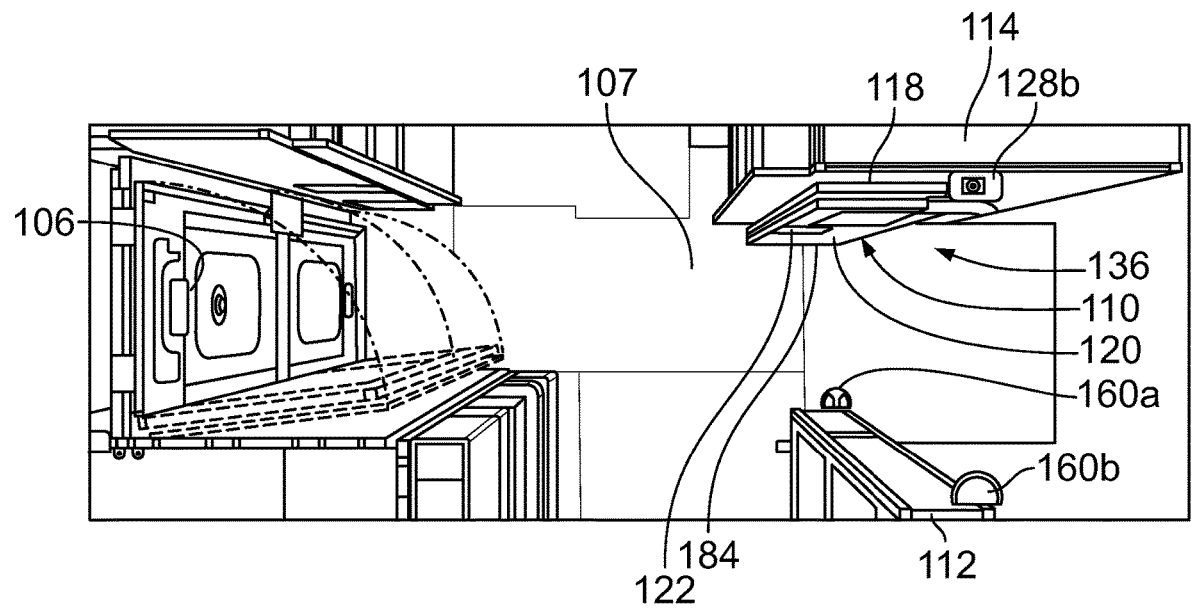
FIG. 8 illustrates a perspective top view of the secondary barrier door in the stowed position, according to an example of the present disclosure.
Figure 9:
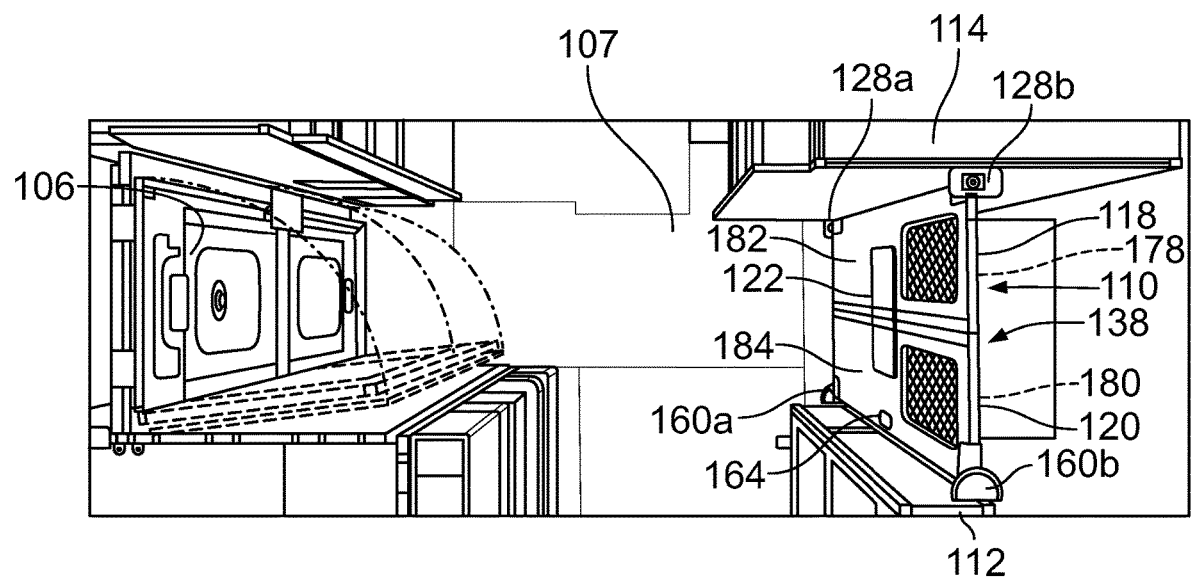
FIG. 9 illustrates a perspective top view of the secondary barrier door of FIG. 8 in the deployed position.

FIG. 5 illustrates a perspective front view of the secondary barrier door 110 in the stowed position 136, according to an example of the present disclosure. FIG. 6 illustrates a perspective view of the secondary barrier door 110 of FIG. 5 in the deployed position 138. FIG. 7 illustrates a lateral view of the secondary barrier door 110 in the stowed position 136. FIG. 8 illustrates a perspective top view of the secondary barrier door 110 in the stowed position, according to an example of the present disclosure. FIG. 9 illustrates a perspective top view of the secondary barrier door 110 of FIG. 8 in the deployed position.

Referring to FIGS. 5-9, the first panel 118 and the second panel 120 can be sized and shaped the same. For example, the first panel 118 and the second panel 120 can be mirror image structures. Optionally, the first panel 118 and the second panel 120 can be sized and shaped differently from one another.

In at least one example, the pivot hinge 122 is disposed between central portions of the first panel 118 and the second panel 120. The pivot hinge 122 can also include a securing device, such as a lock 125, that is configured to selectively lock the secondary barrier door 110 in a desired position, such as the stowed position 136 and/or the deployed position 138. In at least one example, the pivot hinge 122 can be a piano hinge. The pivot hinge 122 is configured to join the first panel 118 to the second panel 120, and can include the lock 125 that securely locks the secondary barrier door 110 in the deployed position 138. The lock 125 can be engaged by a user to selectively lock and unlock the pivot hinge 122. Optionally, the pivot hinge 122 may not include a lock.

The first panel 118 is pivotally coupled to a lower pivot bearing 128a secured to the floor 107, and an upper pivot bearing 128b secured to the ceiling 109. A lower bearing 160a is secured to the floor 107 proximate to the monument 112, and an upper bearing 160b is secured to the ceiling 109 proximate to the monument 112. The lower bearing 160a and the upper bearing 160b are configured to receive and retain the end 134 at lower and upper areas, respectively, when the secondary barrier door 110 is in the deployed position 138. Optionally, only the bearing 160a or the bearing 160b can be used. In at least one other example, the secondary barrier door 110 does not engage any bearing.

As shown, the second panel 120 can include a handle 164, which can be disposed on both sides of the second panel 120. The handle 164 allows an individual to grasp the second panel 120 and readily move the secondary barrier door 110 between the stowed position 136 and the deployed position 138.

As described herein, the secondary barrier door 110 includes the first panel 118 pivotally coupled to the second panel 120 to provide a bi-fold door, which can extend between the floor 107 and the ceiling 109. In the stowed position 136, the secondary barrier door 110 is folded, such that an aft face 178 (that is, a surface configured to face aft when the secondary barrier door 110 is in the deployed position 138) of the first panel 118 faces an aft face 180 of the second panel 120. In the stowed position 136, the aft face 178 is adjacent (and can abut against) the aft face 180. Further, in the stowed position 136, a fore face 182 (that is, a surface configured to face forward when the secondary barrier door 110 is in the deployed position 138) of the first panel 118 is adjacent to the wall 140 of the monument 114, while a fore face 184 of the second panel 120 faces, and is spaced apart from, the monument 112.

The first panel 118 and the second panel 120 can also include openings 190, such as open channels, windows, screens, and/or the like formed therethrough. The openings 190 allow for viewing therethrough. Optionally, one or both of the first panel 118 and/or the second panel 120 may not include an opening.

Figure 10:
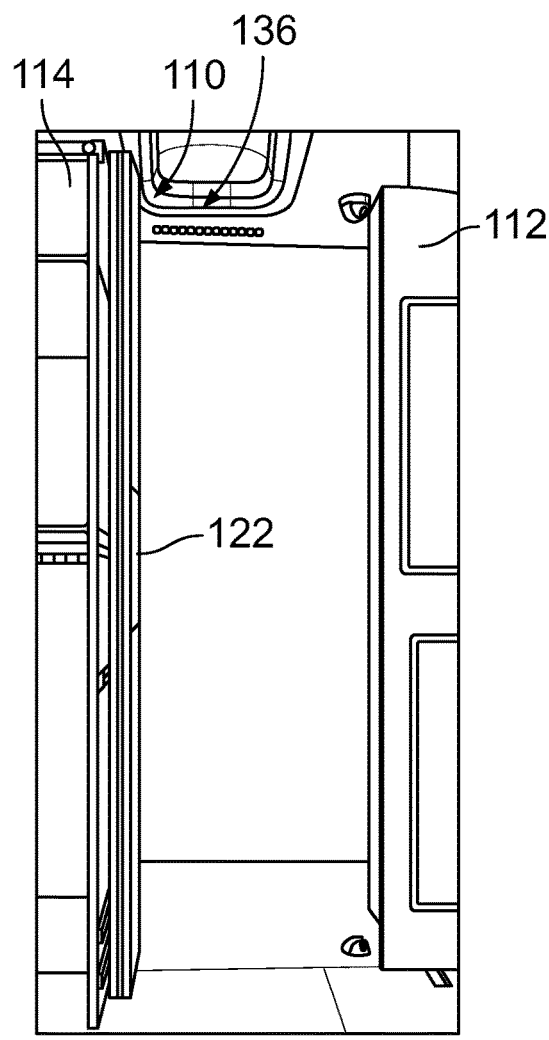
FIG. 10 illustrates a front view of the secondary barrier door in the stowed position, according to an example of the present disclosure.
Figure 11:
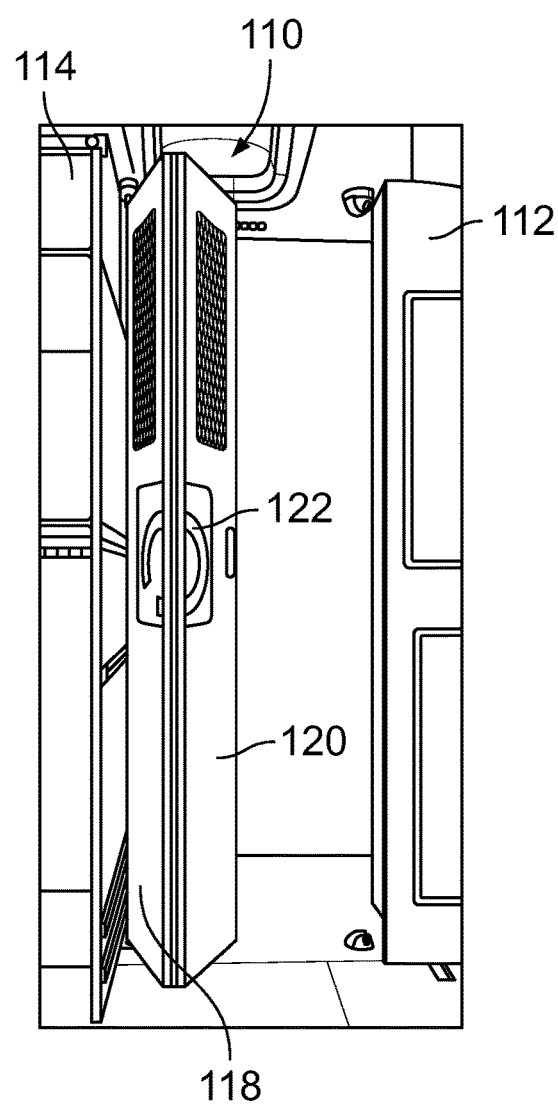
FIG. 11 illustrates a front view of the secondary barrier door in a first intermediate position, according to an example of the present disclosure.
Figure 12:
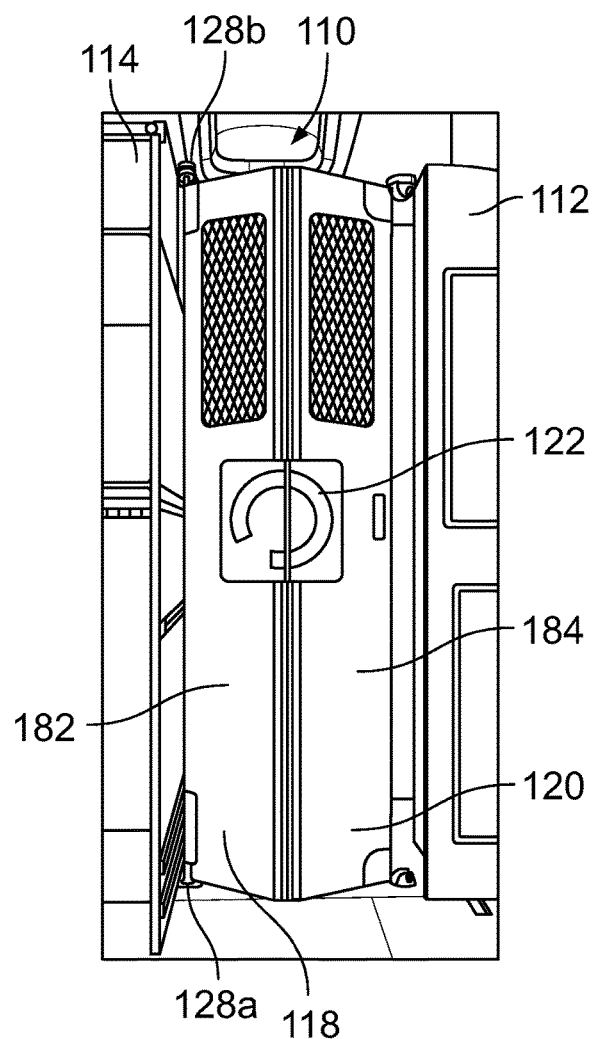
FIG. 12 illustrates a front view of the secondary barrier door in a second intermediate position, according to an example of the present disclosure.
Figure 13:
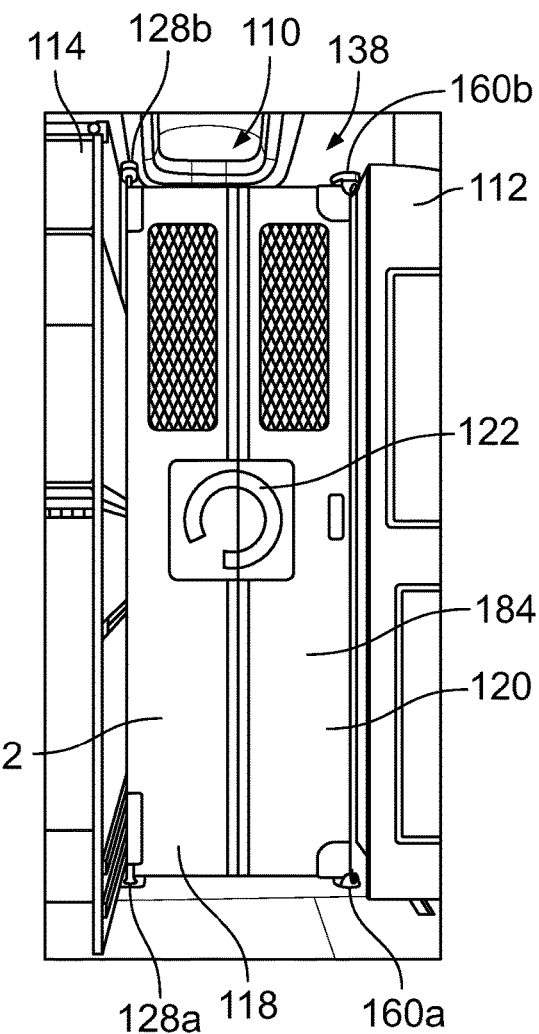
FIG. 13 illustrates a front view of the secondary barrier door in the deployed position, according to an example of the present disclosure.

FIG. 10 illustrates a front view of the secondary barrier door 110 in the stowed position 136. FIG. 11 illustrates a front view of the secondary barrier door 110 in a first intermediate position. FIG. 12 illustrates a front view of the secondary barrier door 110 in a second intermediate position. FIG. 13 illustrates a front view of the secondary barrier door 110 in the deployed position. The views shown in FIGS. 10-13 are from a position within the flight deck 104 looking aft. As described herein, in the stowed position 136, the secondary barrier door 110 is folded adjacent to the monument 114. In order to move the secondary barrier door 110 into the deployed position 138, the secondary barrier door 110 is pivoted about the pivot hinge 122 and extended to the monument 112.

Figure 14:
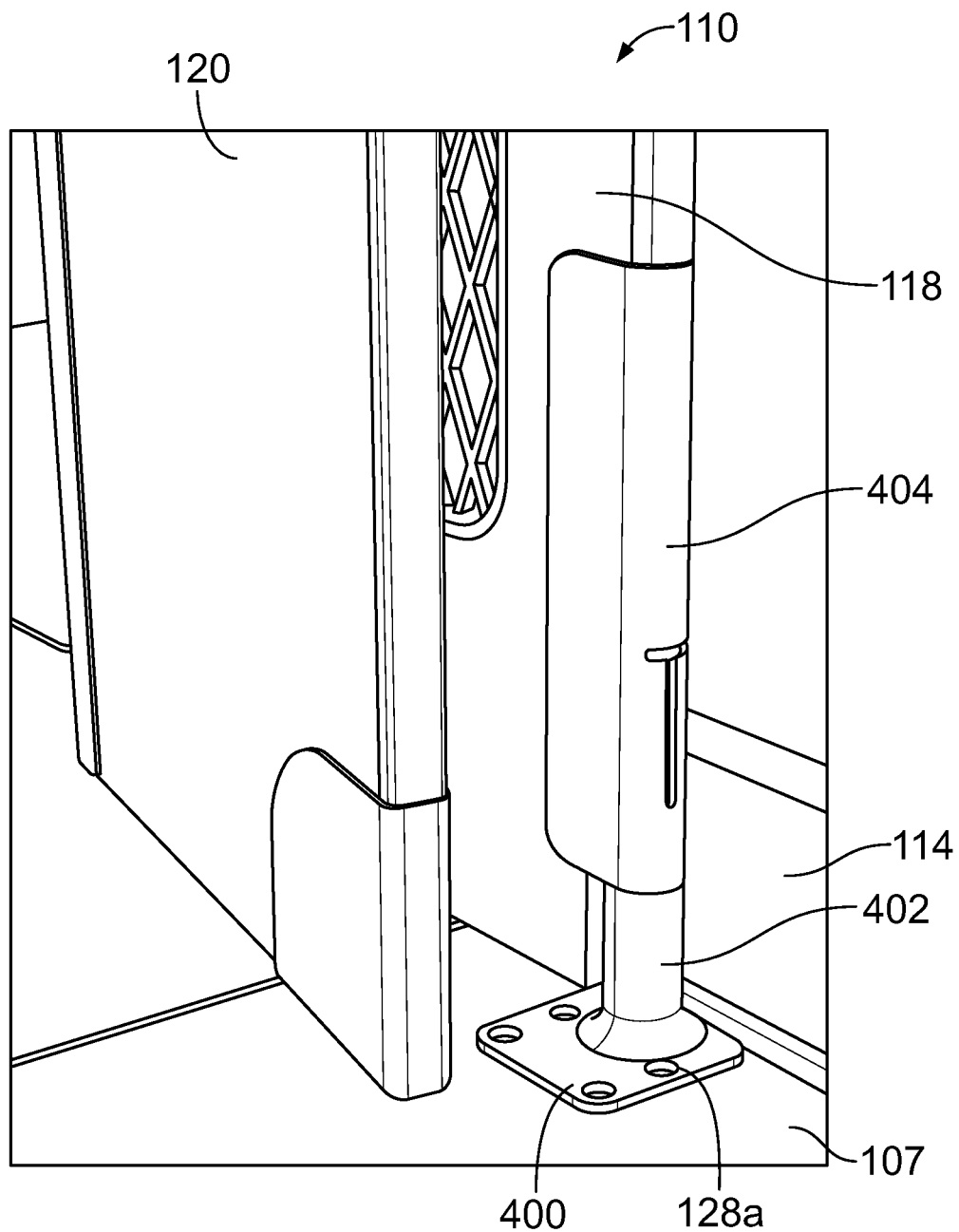
FIG. 14 illustrates a perspective view of a lower portion of the secondary barrier door, according to an example of the present disclosure.

FIG. 14 illustrates a perspective view of a lower portion of the secondary barrier door 110, according to an example of the present disclosure. The lower pivot bearing 128a can include a base 400 mounted to the floor 107. A pivot axle 402 extends upwardly from the base 400. A portion of the pivot axle 402 is pivotally retained within a reciprocal retainer 404 (such as a sleeve, cuff, tube, and/or the like) of the first panel 118. The upper pivot bearing 128b can be similarly configured, and secured to the ceiling 109, as described in relation to FIGS. 5-9.

Figure 15:
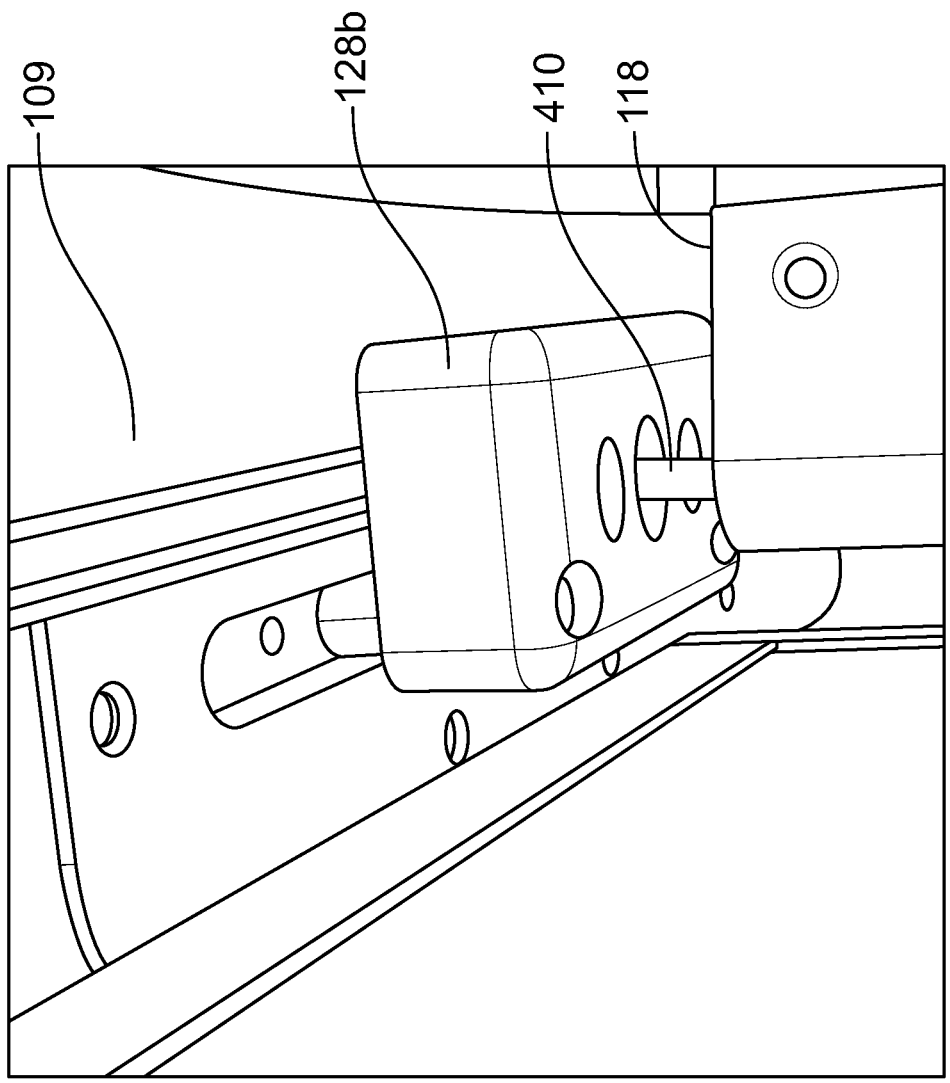
FIG. 15 illustrates a perspective view of an upper pivot bearing mounted to a ceiling, according to an example of the present disclosure.

FIG. 15 illustrates a perspective view of an upper pivot bearing 128b mounted to a ceiling 109, according to an example of the present disclosure. In this example, the upper pivot bearing 128b can be secured to the ceiling 109 using standard inserts (or tie-in secondary supports). The upper pivot bearing 128b receives an upper pin 410 extending upwardly from the first panel 118. The upper pivot bearing 128b can be configured to constrain the pin 410 in two axes (such as an X axis and a Y axis), but allow for linear shifting in a third axis (such as a Z axis). The upper pivot bearing 128b can be allow an axis of rotation to be fit/faired at installation using slotted features. The upper pivot bearing 128b can also include dampers, such as elastomeric dampers, to reduce noise during operation.

Figure 16:
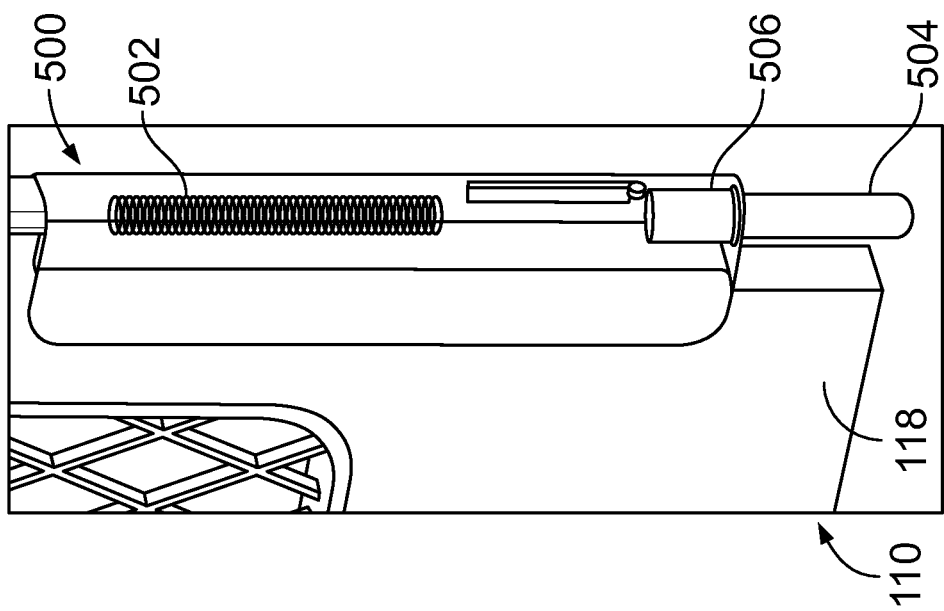
FIG. 16 illustrates a perspective view of an override device secured to a first panel, according to an example of the present disclosure.

FIG. 16 illustrates a perspective view of an override device 500 secured to the first panel 118, according to an example of the present disclosure. In at least one example, the secondary barrier door 110 includes an override device, such as the override device 500. The override device 500 is configured to allow the secondary barrier door 110 to be completely removed, if desired. An override device 500 can be secured at a lower end and an upper end of the first panel 118. As an example, the override device 500 can include a compression spring 502 configured to engage a pivot pin or axle 504, and an accessible cap screw 506, which provides a release mechanism. The cap screw 506 can be engaged to compress the spring 502 and disengage the axle 504, thereby allowing the first panel 118 (and therefore the secondary barrier door 110) to be removed from pivot bearings.

Figure 17:
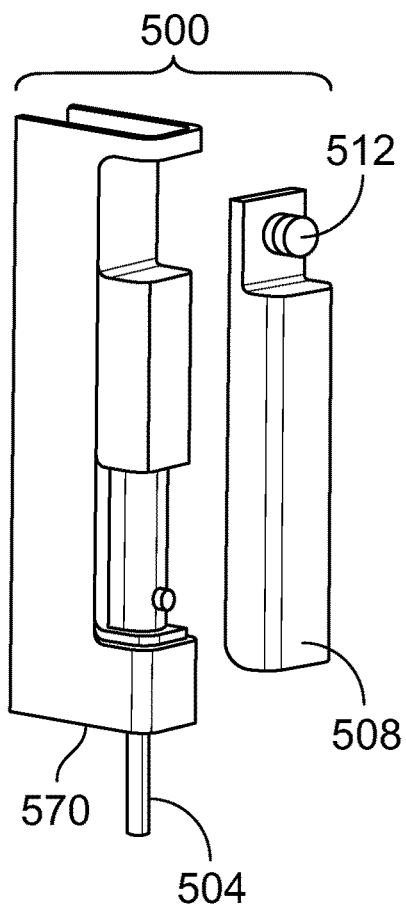
FIG. 17 illustrates a perspective partially exploded view of an override device, according to an example of the present disclosure.

FIG. 17 illustrates a perspective partially exploded view of an override device 500, according to an example of the present disclosure. In this example, a cover plate 508 can be used to cover the cap screw 506. The cover plate 508 can be fastened to a housing with a captive thumbscrew 512.

Figure 18:
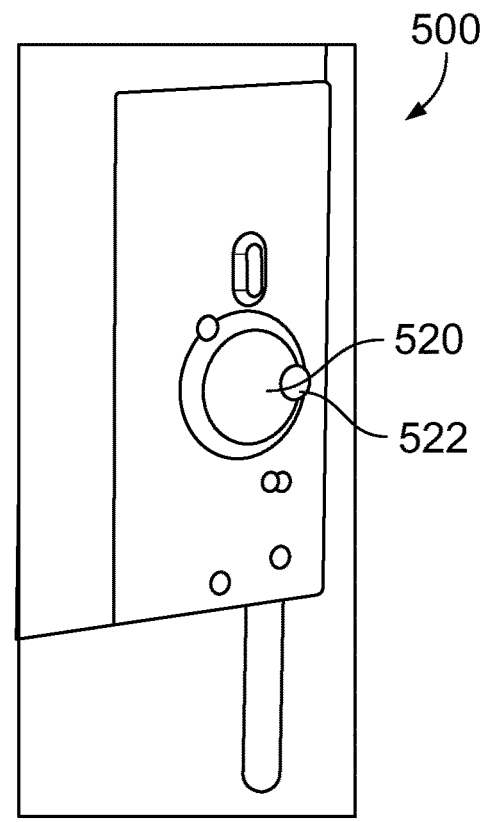
FIG. 18 illustrates a perspective view of an override device, according to an example of the present disclosure.

FIG. 18 illustrates a perspective view of an override device 500, according to an example of the present disclosure. In this example, the override device 500 can be or otherwise include a rotary mechanism 520, having a handle 522 which can be configured to be turned multiple times to retract the pin 504 (shown in FIGS. 16 and 17). The rotatory mechanism 520 can be mounted in a center of the first panel 118 and connect to/control upper and lower pins together.

FIGS. 16-18 show examples of override devices 500, which can be used to remove the secondary barrier door 110 from pivot bearings. Other types of override devices can be used, such as latches. In at least one other example, the secondary barrier door 110 may not include an override device.

Figure 19:
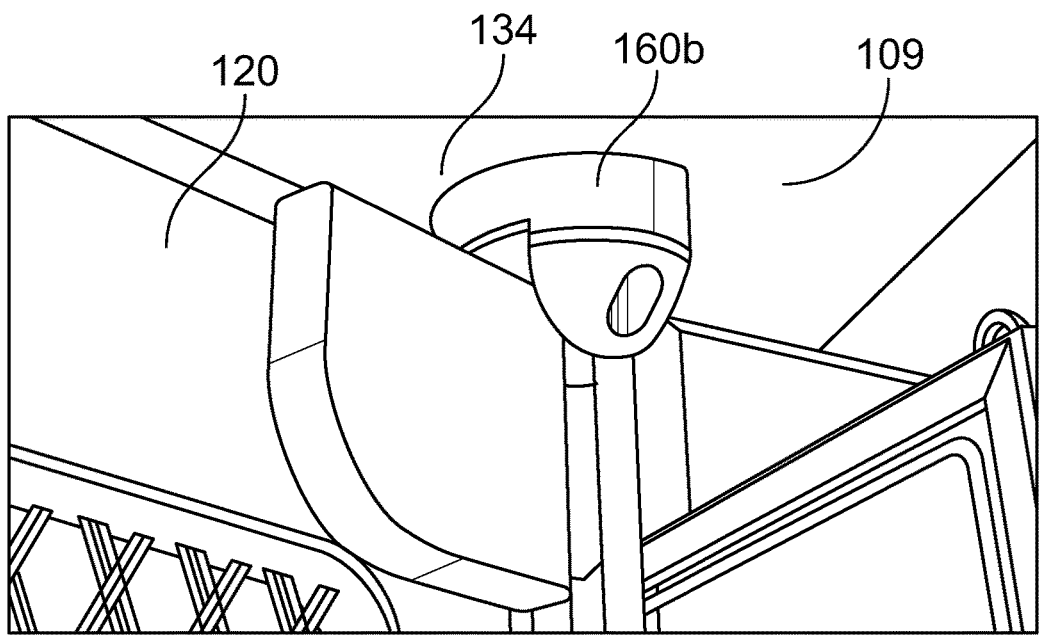
FIG. 19 illustrates a perspective view of an upper bearing retaining an upper portion of an end of a second panel, according to an example of the present disclosure.
Figure 20:
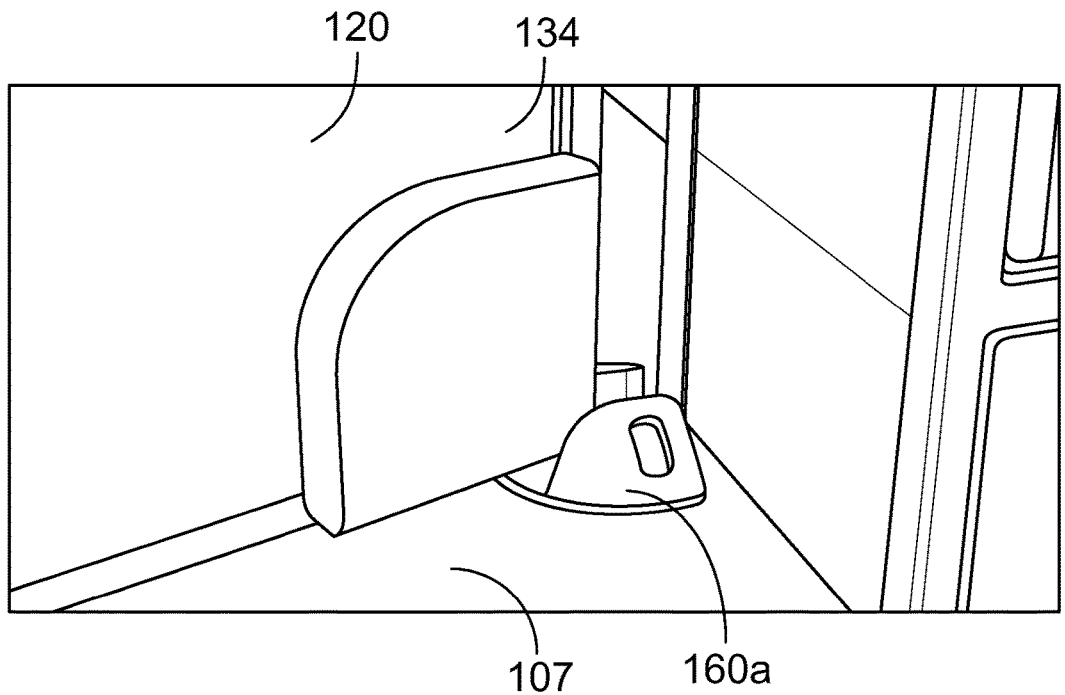
FIG. 20 illustrates a perspective view of a lower bearing retaining a lower portion of the end of the second panel, according to an example of the present disclosure.
Figure 21:
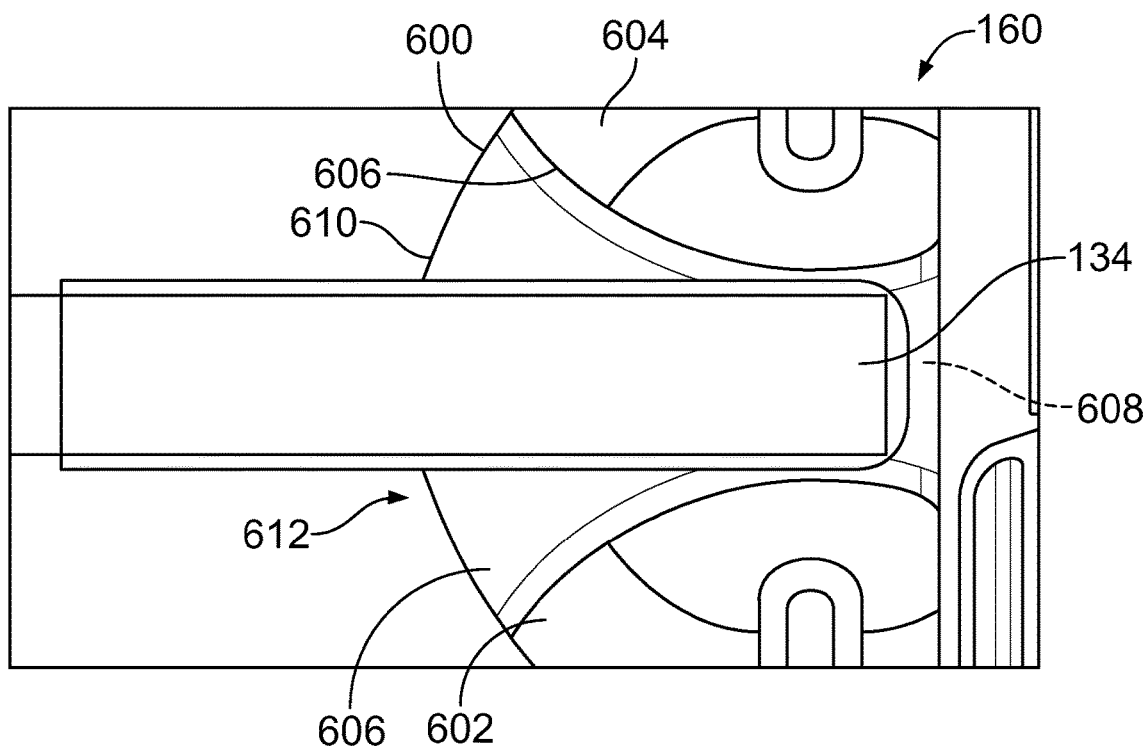
FIG. 21 illustrates a plan view of a bearing retaining the end of the second panel, according to an example of the present disclosure.

FIG. 19 illustrates a perspective view of the upper bearing 160b retaining an upper portion of the end 134 of the second panel 120, according to an example of the present disclosure. FIG. 20 illustrates a perspective view of the lower bearing 160a retaining a lower portion of the end 134 of the second panel 120, according to an example of the present disclosure. FIG. 21 illustrates a plan view of a bearing 160 (such as the lower bearing 160a or the upper bearing 160b) retaining the end 134 of the second panel 120, according to an example of the present disclosure. Referring to FIGS. 19-21, each bearing 160 includes a base 600 secured to a structure (such as the floor 107 or the ceiling 109), and opposed protuberances 602 and 604 extending from the base 600. The protuberances 602 and 604 can be mirror image structures. The protuberances 602 and 604 include recessed lead-in walls 606 that outwardly curve away from a central channel 608 toward a front end 610, thereby providing an expanded lead-in passage 612 for the central channel 608. The expanded lead-in passage 612 allows the end 134 to be pivoted into the central channel 608 and securely retained between the protuberances 602 and 604 within a reduced width portion of the central channel 608.

The bearings shown in FIGS. 19-21 are merely examples, and other types of bearings can be used to securely retain the end 134. For example, spring-loaded retention balls can be used to snapably secure the end 134. As another example, strike fittings having pockets that receive a latching rod or bolt can be used. As another example, hooks can be used to secure the end 134 in a desired position.

Figure 22:
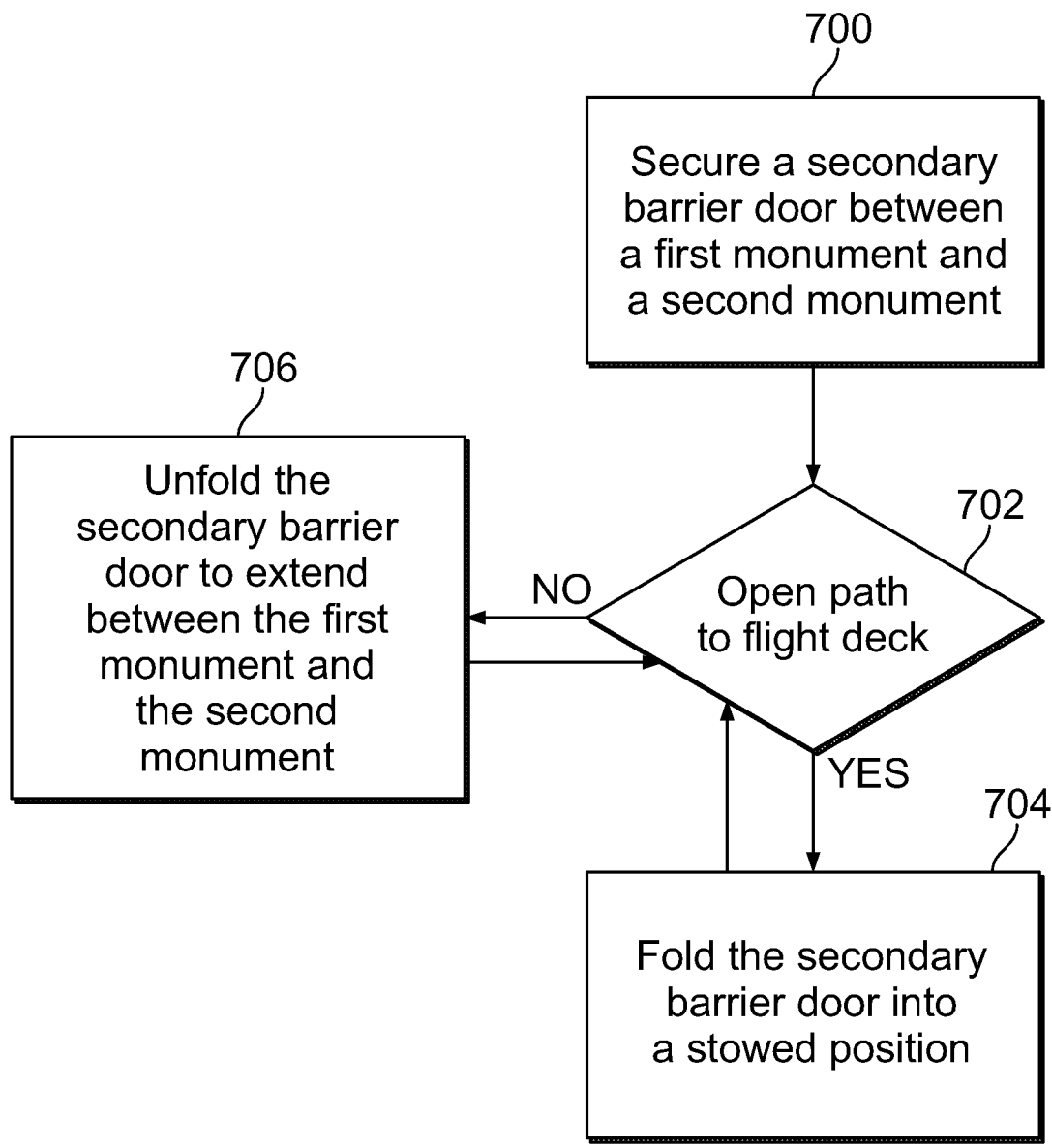
FIG. 22 illustrates a flow chart of a method, according to an example of the present disclosure.

FIG. 22 illustrates a flow chart of a method, according to an example of the present disclosure. Referring to FIGS. 1 and 22, at 700, the secondary barrier door 110 is secured between the first monument 112 and the second monument 114. At 702, it is determined if an open path to the flight deck 104 is desired. If so, the method proceeds from 702 to 704, at which the secondary barrier door 110 is folded into the stowed position 136. The method then returns to 702. If, at 702, an open path to the flight deck is not desired, but the path is to be closed, the method proceeds to 706, at which the secondary barrier door 110 is unfolded to extend between the first monument 112 and the second monument 114.

Referring to FIGS. 1-22, examples of the present disclosure provide a secondary barrier door 110 having foldable portions, such as the first panel 118 and the second panel 120 pivotally coupled together by the pivot hinge 122. The secondary barrier door 110 provides a bi-fold door. The foldable secondary barrier door 110 allows for additional vestibule space due to a smaller sweep volume needed to move the secondary barrier door 110 into the deployed position 138 (in contrast to a full sized slab door).

Further, the disclosure comprises embodiments according to the following clauses:

Clause 1. An aircraft, comprising:
a flight deck including a flight deck door configured to be moved between an open position and a closed position;
a first monument;
a second monument; and
a secondary barrier door moveably secured between the first monument and the second monument, wherein the secondary barrier door is configured to fold into a stowed position in which a path to the flight deck is open, and unfold into a deployed position in which the path to the flight deck is closed.

Clause 2. The aircraft of Clause 1, wherein the secondary barrier door comprises:
a first panel;
a second panel; and
a pivot hinge pivotally coupling the first panel to the second panel.

Clause 3. The aircraft of Clause 2, wherein the first panel is folded adjacent to the first monument, and the second panel is folded adjacent to the first panel when the secondary barrier door is in the stowed position.

Clause 4. The aircraft of Clauses 2 or 3, wherein the first panel is pivotally coupled to a lower pivot bearing secured to a floor, and an upper pivot bearing secured to a ceiling.

Clause 5. The aircraft of any of Clauses 2-4, further comprising a lower bearing and an upper bearing configured to receive and retain an end of the second panel when the secondary barrier door is in the deployed position.

Clause 6. The aircraft of any of Clauses 2-5, wherein the pivot hinge comprises a lock configured to secure the secondary barrier door in a desired position.

Clause 7. The aircraft of any of Clauses 1-6, wherein the secondary barrier door in the deployed position extends between the first monument and the second monument.

Clause 8. The aircraft of any of Clauses 1-7, wherein a closed security vestibule is defined between the flight deck, the first monument, the second monument, and the secondary barrier door in the deployed position.

Clause 9. The aircraft of any of Clauses 1-8, wherein the secondary barrier door is in front of a passenger seating area.

Clause 10. The aircraft of any of Clauses 1-9, wherein the secondary barrier door comprises an override device configured to allow the secondary barrier door to be removed.

Clause 11. A method for an aircraft comprising:
a flight deck including a flight deck door configured to be moved between an open position and a closed position;
a first monument;
a second monument; and
a secondary barrier door moveably secured between the first monument and the second monument, wherein the secondary barrier door is configured to fold into a stowed position in which a path to the flight deck is open, and unfold into a deployed position in which the path to the flight deck is closed,
the method comprising:
folding the secondary barrier door into the stowed position in which the path to the flight deck is open; and
unfolding the secondary barrier into the deployed position in which the path to the flight deck is closed.

Clause 12. The method of Clause 11, wherein the secondary barrier door comprises:
a first panel;
a second panel; and
a pivot hinge pivotally coupling the first panel to the second panel.

Clause 13. The method of Clause 12, wherein the first panel is folded adjacent to the first monument, and the second panel is folded adjacent to the first panel when the secondary barrier door is in the stowed position.

Clause 14. The method of Clauses 12 or 13, wherein the first panel is pivotally coupled to a lower pivot bearing secured to a floor, and an upper pivot bearing secured to a ceiling.

Clause 15. The method of any of Clauses 12-14, receiving and retaining, by a lower bearing and an upper bearing, an end of the second panel when the secondary barrier door is in the deployed position.

Clause 16. The method of any of Clauses 12-15, further comprising securing, by a lock of the pivot hinge, the secondary barrier door in a desired position.

Clause 17. The method of any of Clauses 11-16, wherein the secondary barrier door in the deployed position extends between the first monument and the second monument.

Clause 18. The method of any of Clauses 11-17, wherein a closed security vestibule is defined between the flight deck, the first monument, the second monument, and the secondary barrier door in the deployed position.

Clause 19. The method of any of Clauses 11-18, further comprising allowing, by an override device of the secondary barrier door, the secondary barrier door to be removed.

Clause 20. An aircraft, comprising:
a flight deck including a flight deck door configured to be moved between an open position and a closed position;
a first monument;
a second monument;
a secondary barrier door in front of a passenger seating area, wherein the secondary barrier door is moveably secured between the first monument and the second monument, wherein the secondary barrier door is configured to fold into a stowed position in which a path to the flight deck is open, and unfold into a deployed position in which the path to the flight deck is closed, wherein the secondary barrier door in the deployed position extends between the first monument and the second monument, wherein a closed security vestibule is defined between the flight deck, the first monument, the second monument, and the secondary barrier door in the deployed position, and wherein the secondary barrier door comprises:
a first panel;
a second panel;
a pivot hinge pivotally coupling the first panel to the second panel, wherein the first panel is folded adjacent to the first monument, and the second panel is folded adjacent to the first panel when the secondary barrier door is in the stowed position, wherein the first panel is pivotally coupled to a lower pivot bearing secured to a floor, and an upper pivot bearing secured to a ceiling, and wherein the pivot hinge comprises a lock configured to secure the secondary barrier door in a desired position; and
an override device configured to allow the secondary barrier door to be removed; and
a lower bearing and an upper bearing configured to receive and retain an end of the second panel when the secondary barrier door is in the deployed position.

As described herein, examples of the present disclosure provide barrier systems and methods for preventing access to a flight deck during a door transition. Further, examples of the present disclosure provide efficient and effective systems and methods for providing a secondary barrier to a flight deck.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, aft may be changed to forward, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An aircraft, comprising:
a flight deck including a flight deck door configured to be moved between an open position and a closed position;
a first monument;
a second monument; and
a secondary barrier door moveably secured between the first monument and the second monument, wherein the secondary barrier door is configured to fold into a stowed position in which a path to the flight deck is open, and unfold into a deployed position in which the path to the flight deck is closed,
wherein the secondary barrier door comprises:
a first panel;
a second panel; and
a pivot hinge pivotally coupling a first central portion of the first panel to a second central portion of the second panel, wherein the pivot hinge is between the first panel and the second panel, and wherein the pivot hinge comprises a lock; and
a lower bearing and an upper bearing configured to receive and retain an end of the second panel when the secondary barrier door is in the deployed position, wherein each of the lower bearing and the upper bearing comprises:
a base; and
opposed protuberances extending from the base, wherein the opposed protuberances include recessed lead-in walls that outwardly curve away from a central channel toward a front end thereby providing an expanded lead-in passage between the opposed protuberances.

2. The aircraft of claim 1, wherein the first panel is folded adjacent to the first monument, and the second panel is folded adjacent to the first panel when the secondary barrier door is in the stowed position.

3. The aircraft of claim 1, wherein the first panel is pivotally coupled to a lower pivot bearing secured to a floor, and an upper pivot bearing secured to a ceiling.

4. The aircraft of claim 1, wherein the secondary barrier door in the deployed position extends between the first monument and the second monument.

5. The aircraft of claim 1, wherein a closed security vestibule is defined between the flight deck, the first monument, the second monument, and the secondary barrier door in the deployed position.

6. The aircraft of claim 1, wherein the secondary barrier door is in front of a passenger seating area.

7. The aircraft of claim 1, wherein the secondary barrier door comprises an override device configured to allow the secondary barrier door to be removed.

8. A method for an aircraft comprising:
a flight deck including a flight deck door configured to be moved between an open position and a closed position;
a first monument;
a second monument; and
a secondary barrier door moveably secured between the first monument and the second monument, wherein the secondary barrier door is configured to fold into a stowed position in which a path to the flight deck is open, and unfold into a deployed position in which the path to the flight deck is closed,
wherein the secondary barrier door comprises:
a first panel;
a second panel; and
a pivot hinge pivotally coupling a first central portion of the first panel to a second central portion of the second panel, wherein the pivot hinge is between the first panel and the second panel, and wherein the pivot hinge comprises a lock,
the method comprising:
folding the secondary barrier door into the stowed position in which the path to the flight deck is open;
unfolding the secondary barrier door into the deployed position in which the path to the flight deck is closed;
receiving and retaining, by a lower bearing and an upper bearing, an end of the second panel when the secondary barrier door is in the deployed position, wherein each of the lower bearing and the upper bearing comprises:
a base; and
opposed protuberances extending from the base, wherein the opposed protuberances include recessed lead-in walls that outwardly curve away from a central channel toward a front end thereby providing an expanded lead-in passage between the opposed protuberances.

9. The method of claim 8, wherein the first panel is folded adjacent to the first monument, and the second panel is folded adjacent to the first panel when the secondary barrier door is in the stowed position.

10. The method of claim 8, wherein the first panel is pivotally coupled to a lower pivot bearing secured to a floor, and an upper pivot bearing secured to a ceiling.

11. The method of claim 8, wherein the secondary barrier door in the deployed position extends between the first monument and the second monument.

12. The method of claim 8, wherein a closed security vestibule is defined between the flight deck, the first monument, the second monument, and the secondary barrier door in the deployed position.

13. The method of claim 8, further comprising allowing, by an override device of the secondary barrier door, the secondary barrier door to be removed.

14. An aircraft, comprising:
a flight deck including a flight deck door configured to be moved between an open position and a closed position;
a first monument;
a second monument;
a secondary barrier door in front of a passenger seating area, wherein the secondary barrier door is moveably secured between the first monument and the second monument, wherein the secondary barrier door is configured to fold into a stowed position in which a path to the flight deck is open, and unfold into a deployed position in which the path to the flight deck is closed, wherein the secondary barrier door in the deployed position extends between the first monument and the second monument, wherein a closed security vestibule is defined between the flight deck, the first monument, the second monument, and the secondary barrier door in the deployed position, and wherein the secondary barrier door comprises:

a first panel;

a second panel;

a pivot hinge pivotally coupling a first central portion of the first panel to a second central portion of the second panel, wherein the pivot hinge is between the first panel and the second panel, wherein the first panel is folded adjacent to the first monument, and the second panel is folded adjacent to the first panel when the secondary barrier door is in the stowed position, wherein the first panel is pivotally coupled to a lower pivot bearing secured to a floor, and an upper pivot bearing secured to a ceiling, and wherein the pivot hinge comprises a lock; and an override device configured to allow the secondary barrier door to be removed;

and a lower bearing and an upper bearing configured to receive and retain an end of the second panel when the secondary barrier door is in the deployed position, wherein each of the lower bearing and the upper bearing comprises:

a base; and opposed protuberances extending from the base, wherein the opposed protuberances include recessed lead-in walls that outwardly curve away from a central channel toward a front end thereby providing an expanded lead-in passage between the opposed protuberances.

15. The aircraft of claim 1, wherein the lock is engageable to selectively lock and unlock the pivot hinge.

16. The aircraft of claim 7, wherein the override device comprises:

a pivot axle;

a compression spring configured to engage the pivot axle; and a cap screw, wherein the cap screw provides a release mechanism, and wherein the cap screw is configured to be engaged to compress the spring and disengage the pivot axle.

17. The method of claim 8, wherein the lock is engageable to selectively lock and unlock the pivot hinge.

18. The method of claim 13, wherein the override device comprises:

a pivot axle;

a compression spring configured to engage the pivot axle; and a cap screw, wherein the cap screw provides a release mechanism, and wherein the cap screw is configured to be engaged to compress the spring and disengage the pivot axle.

19. The aircraft of claim 14, wherein the lock is engageable to selectively lock and unlock the pivot hinge.

20. The aircraft of claim 14, wherein the override device comprises:

a pivot axle;

a compression spring configured to engage the pivot axle; and a cap screw, wherein the cap screw provides a release mechanism, and wherein the cap screw is configured to be engaged to compress the spring and disengage the pivot axle.

* * * * *